United States Patent Office 3,639,470
Patented Feb. 1, 1972

3,639,470
PROCESS FOR THE PRODUCTION OF MIXED CARBOXYLIC-SULFONIC ACID CHLORIDE DERIVATIVES OF BENZENE
Shigeto Suzuki, San Francisco, Calif., assignor to Chevron Research Company, San Francisco, Calif.
No Drawing. Filed May 1, 1968, Ser. No. 725,950
Int. Cl. C07c 51/58
U.S. Cl. 260—544 R      5 Claims

ABSTRACT OF THE DISCLOSURE

Mixed acid chlorides of the formula $$XC_6H_3(SO_2Cl)(COCl)$$

are prepared by the reaction of the corresponding diacid with carbon tetrachloride. Relative to each other, the acid groups must be of the meta orientation. The use of a strong mineral acid catalyst, an elevated reaction temperature and a pressure sufficient to maintain carbon tetrachloride in the liquid phase are necessary conditions.

---

This invention relates to a process for the production of a mixed acid chloride of the formula $$XC_6H_3(SO_2Cl)(COCl)$$

X may be hydrogen, or a methyl, phenyl or chloride group. The acid radicals relative to each other must be meta oriented.

Still more particularly, this invention relates to a process for the production of the above described mixed acid chlorides by the reaction of the corresponding sulfonic-carboxylic diacids with carbon tetrachloride at an elevated temperature in the presence of a strong mineral acid catalyst and under an elevated pressure.

The bifunctionality of the subject acid chlorides and their relatively high reactivities makes them useful for the production of linear polymers as known in the art (cf. British Pat. No. 975,813).

It has now been found that carbon tetrachloride reacts with a mixed acid of the formula $$XC_6H_3(SO_3H)(CO_2H)$$

to yield the corresponding acid chloride of the formula $XC_6H_3(SO_2Cl)(COCl)$ provided (1) the relative location of the acid groups in the benzene nucleus is of the meta orientation; (2) the reaction temperature is above about 130° C. and less than the decomposition temperature of the corresponding dichloride; (3) the mixture of the reactants is under a pressure sufficient to maintain carbon tetrachloride in the liquid phase; (4) the reaction is catalyzed by a strong mineral acid; and (5) at least about 1.8 mols of the tetrahalide per mol of the diacid is used in the reaction. R and X in the formula are defined and oriented as described above.

By a strong mineral acid is meant sulfuric, phosphoric, polyphosphoric and the like acids. Sulfuric acid is preferred.

In a preferred embodiment a substantially anhydrous mixture of 3-carboxy-benzenesulfonic acid, carbon tetrachloride and sulfuric acid in the mol ratio of 1:2.5:0.1, respectively, is charged to a corrosion resistant autoclave. The reaction vessel and contents is heated at a temperature of about 180° C. for a period of about 2 hours and at a system pressure sufficient to maintain the required carbon tetrachloride reaction phase. The yield of the corresponding diacid dichloride is excellent. Little or no by-product material is formed in the process. The subject mixed acids are sparingly soluble at best in carbon tetrachloride. So small is this solubility that it is likely that a liquid-solid heterogeneous reaction system is involved. Nevertheless, reaction rates and conversions are excellent.

The reaction appears to be represented by the equation:

$$XC_6H_3(SO_3H)(CO_2H) + 2CCl_4 \xrightarrow{H^+} XC_6H_3(SO_2Cl)(COCl) + 2HCl + 2COCl_2$$

For a satisfactory reaction, the temperature must be above about 130° C. On the other hand, depending upon the particular diacid chloride being produced, decomposition occurs in the range from about 220° C. to 250° C. Therefore, the reaction should be carried out below the decomposition temperature. The temperature range from about 140° C. to 200° C. is preferred.

The reaction time which should be used in the subject process varies depending upon the temperature and mixed-acid feed used. In general a satisfactory time is in the range from a few minutes, e.g., 3, to a few hours. At the upper end of this temperature range a reaction time of a few minutes is in general satisfactory; on the other hand, at about 130° C. a reaction time of from about 3 to 6 hours is necessary in order to obtain a reasonable conversion and yield.

For a satisfactory yield of the desired acid chloride a substantially stoichiometric, i.e., of the order of at least about 1.8 mols of carbon tetrachloride per mol of the mixed acid, ratio of reactants must be present. Best results are obtained in general when the ratio is about 2.0 to 2.5. Larger relative amounts of the tetrahalide may be used except that at an excessive ratio, i.e., at about 50 to 1, respectively, and higher, the relative efficiency of the process becomes impracticable.

As little as 0.001 mol of the mineral acid catalyst per mol of the mixed acid feed is sufficient for effective catalysis. Better results obtain when larger relative amounts are used, i.e., of the order of about 0.01 to 0.1 mol, respectively. The use of an excessive amount of acid is undesirable for several reasons including cost and relative ease of purification of the product. Depending upon the mixed-acid chloride being produced and the acid catalyst being employed, the acid catalyst to feed ratio should not exceed about 0.5–1 to 1, respectively. Preferably the feed to catalyst mol ratio is in the range 1 to 0.01–0.1, respectively.

In general, the mixed acid feeds for this process are not soluble in the usual inert solvents. Where solvent action is desirable as for the product or for better heat transfer relations, the presence of excess carbon tetrachloride is in general the preferred expedient. On the other hand, inert diluents such as methylene chloride, chloroform, chlorobenzene, dichlorobenzene and the like may be present in the reacting system.

The mixed-acid feeds as defined above are in general suitable feeds for the instant process. Mixtures of these acids may also be employed, particularly isomeric mixtures as well as specie mixtures.

Representative process feed compounds useful in the instant process include the following acids:

3-carboxybenzenesulfonic,
3-carboxy-4-methylbenzenesulfonic,
3-carboxy-5-phenylbenzenesulfonic,
3-carboxy-5-chlorobenzenesulfonic,
3-carboxy-2-methylbenzenesulfonic,
3-carboxy-2-chlorobenzenesulfonic acid, and the like acids. 3-carboxybenzenesulfonic acid is preferred.

The following examples are included to further illustrate the invention.

EXAMPLE 1

Into a corrosion resistant pressure reactor equipped with a stirrer, a temperature sensor and a gas release valve, a mixture of 3-carboxybenzenesulfonic acid, carbon tetrachloride and sulfuric acid were charged. The mol ratio of the charge was 1:0:0.1, respectively. At 180° C. and after a 2.4 hour reaction period a 92 mol percent yield of 3-carbonylbenzenesulfonyl dichloride was produced.

EXAMPLE 2

Example 1 was repeated except that no sulfuric acid was added. Only 8 mol percent of the dichloride was produced.

EXAMPLE 3

Example 1 was repeated except that about 5 weight percent of water was substiuted for the sulfuric acid. Only about 9 mol percent of the diacid dichloride was produced.

EXAMPLE 4

Example 1 was repeated except that (a) the mol ratio was 1:2.5:0.05, respectively, and (b) the reaction time was 3.5 hours. The yield of the dichloride was over 99 mol percent.

EXAMPLE 5

Example 1 was repeated except that polyphosphoric acid was employed as the catalyst at a concentration of 5 weight percent based on the organic acid. The mol ratio of mixed acid to carbon tetrachloride was 1:10, respectively. Reaction was carried out at 190° C. for 6.5 hours. The yield of 3-carbonylbenzenesulfonyl dichloride was 91 mol percent.

EXAMPLE 6

A mixture of 2-carboxybenzenesulfonic acid anhydride, carbon tetrachloride and sulfuric acid in the mol ratio 1:10:0.1 was charged to the reactor as in Example 1. After a reaction period of 5 hours at 180° C. less than 1 percent of the desired diacid dichloride was formed.

The above examples demonstrate that when a carboxylic acid group and a sulfonic acid group are attached to a benzene nucleus with these groups meta oriented relative to each other, they are readily and efficiently converted to the corresponding acid chloride groups under the conditions of the subject process.

It will be readily appreciated from the foregoing disclosure and examples that variations can be made by those skilled in the art without departing from the scope and spirit of the appended claims.

What is claimed is:
1. The process for the production of a carbonylbenzenesulfonyl chloride, consisting essentially of reacting a carboxybenzenesulfonic acid feed with carbon tetrachloride by heating a mixture of said reactants at a temperature in the range above 130° C. and below the thermal decomposition temperature of the resulting carbonylbenzenesulfonyl chloride and at a pressure sufficient to maintain carbon tetrachloride in the liquid phase, wherein the mixture contains for each mol of the carboxybenzenesulfonic acid an amount of the tetrachloride in the range from 1.8 to 50 mols, and an amount of sulfuric or phosphoric acid catalyst in the range from 0.001 to 1 mol, wherein said acid feed is selected from the group consisting of 3-carboxybenzenesulfonic, 3-carboxy-4-methylbenzenesulfonic, 3-carboxy-5 - phenylbenzenesulfonic, 3-carboxy-5-chlorobenzenesulfonic, 3-carboxy-2-methylbenzenesulfonic, and 3-carboxy-2-chlorobenzenesulfonic acids, and wherein the resulting carbonylbenzenesulfonyl chloride corresponds to said acid feed.

2. The process as in claim 1 wherein said reaction temperature is in the range from 140° C. to 200° C.; wherein the amount of carbon tetrachloride is in the range 2 to 2.5 mols, wherein the catalyst is sulfuric acid and the amount of the sulfuric acid is in the range from 0.01 to 0.1 mol; and wherein said temperature is maintained for a reaction time in the range from three minutes to six hours.

3. The process for the production of a carbonylbenzenesulfonyl chloride, which comprises reacting a carboxybenzenesulfonic acid feed with carbon tetrachloride by heating a mixture of said reactants at a temperature in the range above 130° C. and below the thermal decomposition temperature of the resulting carbonylbenzenesulfonyl chloride and at a pressure sufficient to maintain carbon tetrachloride in the liquid phase, wherein the mixture contains for each mol of the carboxybenzenesulfonic acid an amount of the tetrachloride in the range from 1.8 to 50 mols, and an amount of phosphoric acid catalyst in the range from 0.001 to 0.5 mol, wherein said acid feed is selected from the group consisting of 3-carboxybenzenesulfonic, 3-carboxy - 4 - methylbenzenesulfonic, 3-carboxy-5-phenylbenzenesulfonic, 3-carboxy-5-chlorobenzenesulfonic, 3-carboxy-2 - methylbenzenesulfonic, and 3-carboxy-2-chlorobenzenesulfonic acids, and wherein the resulting carbonylbenzenesulfonyl chloride corresponds to said acid feed.

4. The process for the production of 3-carbonylbenzenesulfonyl dichloride, consisting essentially of reacting 3-carboxybenzenesulfonic acid with carbon tetrachloride by heating a mixture consisting essentially of said reactants and sulfuric acid at a temperature of about 180° C., and at a pressure sufficient to maintain the tetrachloride in the liquid phase, said heating being for a period of about 2.4 hours, wherein for each mol of the sulfonic acid about 10 mols of the tetrachloride and about 0.1 mol of sulfuric acid are present in the reaction mixture.

5. The process for the production of 3-carbonylbenzenesulfonyl dichloride, consisting essentially of reacting 3-carboxybenzenesulfonic acid with carbon tetrachloride by heating a mixture consisting essentially of said reactants and polyphosphoric acid at a temperature of about 190° C. and at a pressure sufficient to maintain the tetrachloride in the liquid phase, said heating being for a period of about 6.5 hours, wherein for each mol of the sulfonic acid about 10 mols of the tetrachloride and about 0.1 mol of polyphosphoric acid are present in the reaction mixture.

References Cited

UNITED STATES PATENTS

| 2,946,815 | 7/1960 | Hamor | 260—470 |
|---|---|---|---|
| 2,806,061 | 9/1957 | Wygant | 260—544 |

FOREIGN PATENTS 135,482    5/1960    U.S.S.R.

LEWIS GOTTS, Primary Examiner
E. J. GLEIMAN, Assistant Examiner